United States Patent [19]

Tanaka et al.

[11] Patent Number: 4,769,654

[45] **Date of Patent: * Sep. 6, 1988**

[54] INK JET PRINTING HEAD HAVING PLURALITY OF INK-JETTING UNITS DISPOSED PARALLEL TO CIRCULAR-SHAPED REFERENCE PLANE

[75] Inventors: Yasuhiko Tanaka, Fuchushi; Yoshiaki Kimura, Hachioji, both of Japan

[73] Assignee: Konishiroku Photo Industry Co., Ltd., Tokyo, Japan

[ * ] Notice: The portion of the term of this patent subsequent to Jun. 4, 2002 has been disclaimed.

[21] Appl. No.: 919,619

[22] Filed: Oct. 14, 1986

Related U.S. Application Data

[63] Continuation of Ser. No. 806,120, Dec. 6, 1985, abandoned, which is a continuation of Ser. No. 528,127, Aug. 31, 1983, abandoned.

[30] Foreign Application Priority Data

| | | | |
|---|---|---|---|
| Sep. 1, 1982 | [JP] | Japan | 57-153300 |
| Sep. 1, 1982 | [JP] | Japan | 57-133442[U] |
| Sep. 25, 1982 | [JP] | Japan | 57-145335[U] |

[51] Int. Cl.⁴ ..... G01D 15/18

[52] U.S. Cl. ..... 346/140 R

[58] Field of Search ..... 346/140

[56] References Cited

U.S. PATENT DOCUMENTS

| | | | |
|---|---|---|---|
| 3,747,120 | 7/1973 | Stemme | 346/140 X |
| 4,104,646 | 8/1978 | Fischbeck | 346/140 |
| 4,124,853 | 11/1978 | Kattner | 346/140 |
| 4,189,734 | 2/1980 | Kyser | 346/140 X |
| 4,320,406 | 3/1982 | Heinzl | 346/140 |
| 4,330,787 | 5/1982 | Sato | 346/140 |
| 4,364,067 | 12/1982 | Koto | 346/140 |
| 4,455,560 | 6/1984 | Louzil | 346/140 |
| 4,521,788 | 6/1985 | Kimura | 346/140 |

FOREIGN PATENT DOCUMENTS

| | | |
|---|---|---|
| 55-121076 | 9/1980 | Japan . |
| 55-137976 | 10/1980 | Japan . |

*Primary Examiner*—Joseph W. Hartary

*Attorney, Agent, or Firm*—Frishauf, Holtz, Goodman & Woodward

[57] ABSTRACT

A printing head for ink-jet printing comprises at least one ink-flow passage in the form of a hollow chamber and at least one ink-jet nozzle coupled to the ink-flow passage. The hollow chamber has a substantially uniform depth over substantially the entire area thereof. Preferably, the head comprises at least two laminated sheet-like members, one of the members having a hollow formed therein to comprise the ink-flow passage, and the other of the members having at least one nozzle formed therein. The head further comprises a flexible wall in communication with the hollowed chamber and a piezoelectric transducer connected to the flexible wall for producing ink-jetting pressure changes in the hollow chamber. Also disclosed are multi-nozzle printing heads with the chambers arranged in a circular configuration, and stacked double and triple decker arrangements.

18 Claims, 4 Drawing Sheets

INK JET PRINTING HEAD HAVING PLURALITY OF INK-JETTING UNITS DISPOSED PARALLEL TO CIRCULAR-SHAPED REFERENCE PLANE

This application is a continuation, application of Ser. No. 806,120 filed Dec. 6, 1985, which in turn is a continuation application of Ser. No. 528,127 filed Aug. 31, 1983 (both now abandoned).

BACKGROUND OF THE INVENTION

This invention relates to a printing head for an ink-jet printing apparatus in which hollows for ink-flow passages (channels) are formed in the spaces between each of a plurality of plates are laminated.

A prior art ink-jet printing head, as shown in FIG. 1, comprises a first plate 1 having two hdllows 1*a*, 1*b* which are of different depths and which serve as the ink flow passages. An ink flow passage is formed to serve as a pressure chamber 3 by a second plate 2 arranged on plate 1 over the hollow 1*a*. Another ink flow passage is formed to make an outlet passage 4 by the second plate 2 overlying the hollow 1*b*. Ink is filled inside of these passages. The second plate 2 is normally drilled or etched to form a nozzle 2*a* as the outlet passage 4, together with the ink flow passage formed by the hollow 1*b*. A piezoelectric transducer 5 is provided on plate 2. The piezoelectric transducer 5 inwardly deflects a flexible wall, i.e., a flexible portion of the second plate 2 that serves as a wall of pressure chamber 3, to reduce the volume of the pressure chamber 3 so that ink can be jetted out from the pressure chamber through the ink outlet passage 4.

The ink outlet passage 4 is so designed as to be very small in the cross-sectional area of its passage compared with that of the pressure chamber 3, because of the necessity of ink-jetting. The ink outlet passage 4 is required to have a definite length (in the thickness direction of plate 2) to optimize the jetting performance of ink droplets. In summary, in the conventional ink-jet printing heads, a first plate 1 has been etched to form a two-step hollow. Hollow 1*b* has been provided in addition to the hollow 1*a* to form an ink flow passage, hollow 1*b* serving as a portion of the ink outlet passage. The hollow 1*b* must not only be shallower in depth but also narrower in width than the hollow 1*a*.

The above-described conventional ink-jet printing head is disadvantageous in that a large amount of manufacturing time is required, and also because of the high cost to etch the first plates 1 in a two-stepwise manner as described above.

It is an object of the invention to provide a printing head for an ink-jet printing apparatus which can be readily manufactured at a substantially reduced cost.

SUMMARY OF THE INVENTION

According to the present invention, a printing head for an inkjet printing apparatus capable of attaining the above object of the invention is principally characterized in that a hollow of substanially uniform depth is formed in one portion of the head to serve as an ink flow passage, and a nozzle-orifice having sufficient length necessary for the ink to be ejected is formed on the other portion of the head.

In the invention, only the nozzle-orifice on the outermost portion (or plate) substantially functions as a nozzle, and it is therefore unnecessary to etch a two-step hollow for the ink flow passage of the other portion (or plate). Accordingly, an ink-jet printing head can be manufactured at a low cost. In addition, it is also possible to improve the jetting performance of ink-droplets if such nozzle-orifice is made by etching or drilling in the direction of the thickness of a plate forming the second portion of the printing head.

DETAILED DESCRIPTION

Figure 2:
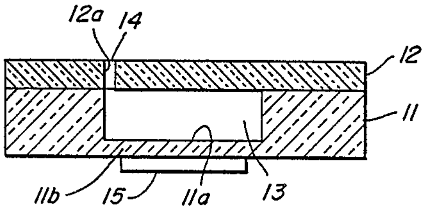
FIG. 2 is a schematic sectional view of a first embodiment of the present invention.

FIG. 2 is a schematic sectional view of one embodiment of an ink-jet printing head for an ink-jet printing apparatus according to the invention. As seen in FIG. 2, a first plate 11 is provided with only one hollow 11*a* formed therein to form a pressure chamber 13. The bottom 11*b* of the hollow 11*a* is made into a flexible wall (i.e., by making it thin). A pieoelectric transducer 15 is adhered to the outer surface of the flexible bottom wall 11*b*. A second plate 12 is mounted on first plate 11 over the hollow 11*a*. The thickness of the second plate 12 is selected so as to satisfy the necessary length of the ink outlet passage 14 and a nozzle-orifice is made by etching or drilling in the direction of the thickness of the plate 12 so that the orifice position can be so selected as to open the orifice to the pressure chamber 13.

Figure 1:
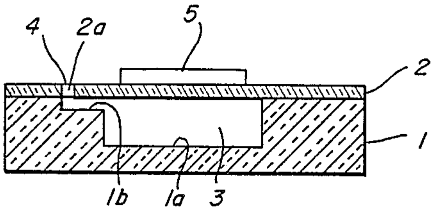
Fig. 1 (PRIOR ART)
FIG. 1 is a schematic sectional view of an example of a prior art jet printing head used in a conventional ink-jet printing apparatus.

Accordingly, in the ink-jet printing head of FIG. 2, the performance conditions of the ink outlet passage nozzle 14 is satisfied by nozzle-orifice 12*a* (i.e., by selecting its diameter and length which is determined by the thickness of plate 12) and it is therefore unnecessary to provide the first plate with a second stepped hollow 1*b* such as shown in FIG. 1. It is also unnecessary to etch the first plate two-stepwise, and thus it is possible to fabricate plate 11 at a lower cost than plate 1 of FIG. 1. The second plate 12 can readily be made uniform and substantially invariable in thickness and it is accordingly possible to make the length of the outlet passage or nozzle 14 more accurate. This enables provision of an ink-jet printing head which is excellent in ink-jet performance of ink droplets.

In most cases, the most suitable length of the nozzle or passage 14 may not agree with the most suitable thickness of the flexible wall to which piezoelectric transducer 15 is adhered. For this reason, since the nozzle-orifice 12*a* is made by etching or drilling in the direction of the thickness of the second plate 12, piezoelectric transducer 15 may have to be provided on the lower surface 11*b* of the first plate 11 as shown in FIG. 2. This arrangement permits selecting the thickness of plate 12 independent of the thickness of the flexible wall to which the transducer 15 is attached.

Figure 3:
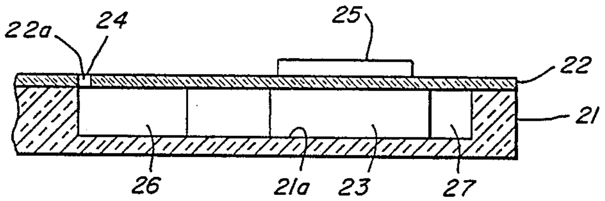
FIG. 3 is a schematic sectional view of another embodiment of the invention, taken along line III—III in FIG. 4 and drawn to a smaller scale than FIG. 4.
Figure 4:
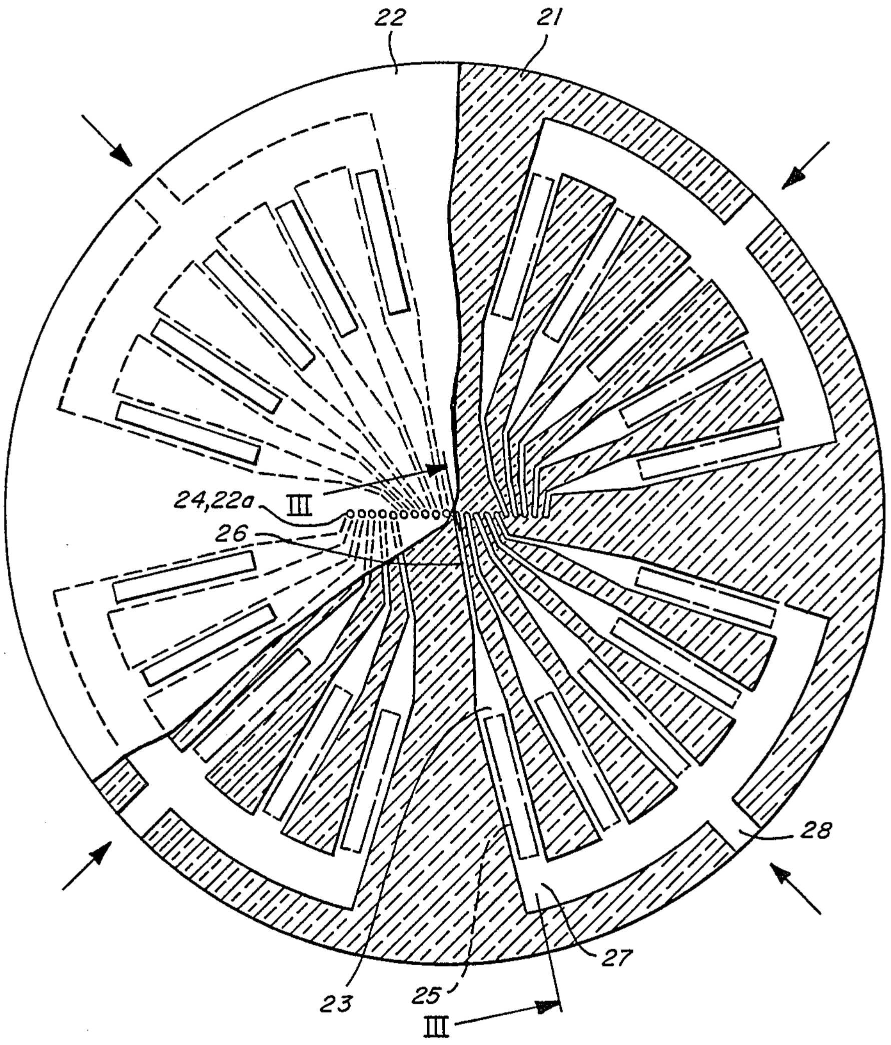
FIG. 4 is a schematic plan view, partially in cross-section, of an ink-jet printing head having multiple channels according to the invention.

FIG. 3 is a schematic sectional view of another embodiment of the invention. A top sectional view of a head having a plurality of the head sections of FIG. 3 is shown in FIG. 4 which is described later. As shown in FIG. 3, a piezoelectric transducer 25 is adhered to a second plate 22 in a conventional manner, and there is formed a reduced cross-sectional size portion liquidly connecting pressure chamber 23 located under the piezoelectric transducer 25 to nozzle 24 (hereinafter this reduced cross-sectional size portion is referred to as a neck 26 - see FIG. 4). The neck 26 is etched to be the same depth as the pressure chamber 23 and the flow performance in the neck 26 is made to agree with the most suitable length of the abovementioned nozzle 14. Thus, the disadvantages of the conventional type two-step etching method may be solved.

FIG. 4 is a schematic view of an example to which the embodiment of FIG. 3 is applied, wherein a multi-channel type printing head providing a high resolution is illustrated. In FIG. 4, like reference numerals designate corresponding parts of the printing head shown in FIG. 3.

As seen in FIG. 4, hollows for a plurality of ink flow passages are provided in the first plate 21 so that a number of pressure chambers 23 may be arranged radially. Each unit comprises a neck portion 26 and a pressure chamber 23. Common ink chambers 27 are provided for groups of the pressure chambers 23, as seen in FIG. 4. A plurality of nozzle-orifices 22*a* are provided in second plate 22 in a line by either etching or drilling the second plate, and the plate 21 is laminated on the plate 22 so that the group of nozzle-orifices 22*a* may be positioned to be almost in the center of the group of the radially arranged pressure chambers 23. In this example, the neck 26, pressure chambers 23 and common ink chambers 27 are of the same depth, and the nozzle-orifices 22*a* function as the nozzles 24. Each nozzle-orifice 22*a* may be positioned at the end of the ink flow passage of the first plate 21 as shown in FIG. 4, or it may be positioned spaced from, but not far from, the end of the ink flow passage of the first plate 21, as shown in FIG. 3. In the case of FIGS. 3 and 4, the piezoelectric transducers 25 are adhered to the first plate 21 in a manner similar to the example shown in FIG. 2.

In FIG. 4, a plurality of ink flow passages each of which comprises nozzle 24, neck 26 and pressure chamber 23 are arranged in groups, each group connecting en bloc to a respective common ink chamber 27 and associated ink supply pipe 28. FIG. 4 shows four blocks or groups of ink flow passages arranged in an ink jet printing head. With this type of ink jet printing head, it becomes possible to perform an ink jet recording in color, or a recording in which ink properties and ink jet performance are different between the blocks or groups of ink flow passages.

Figure 5:
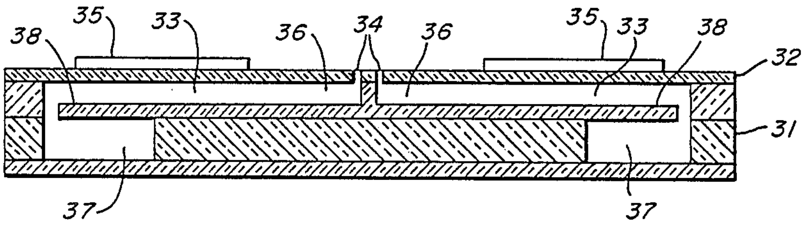
FIGS. 5, 6 and 8 are further schematic sectional views of respective miniaturized multi-nozzle type ink-jet printing heads according to the present invention.

FIG. 5 is a sectional view of a printing head of a further example of the invention, wherein a plurality of nozzles 34 and a plurality of pressure chambers 33 each respectively connected thereto are provided into the substrate 31 of a printing head. Respective piezoelectric transducers 35 are adhered to the outer wall of the pressure chambers 33.

In this example of FIG. 5, a common ink chamber 37 is arranged under the pressure chambers 33 so as to partially overlap with the pressure chamber 33 with the interposition of an intermediate wall 38, so that the common ink chamber 37 may be connected to the other end of a plurality of the pressure chambers 33 as described above, in a double-decker structured printing head. In such a double-decker structure, a plurality of pressure chambers 33 are arranged at the upper stage and one portion of a common ink chamber 37 which is connected to the pressure chambers 33 is arranged in the lower stage with the interposition of intermediate walls such as walls 38. In such a case, it is possible to make the outer diameter of the overall structure smaller than those shown in FIG. 3 and FIG. 4.

Though the common ink chamber 37 is so constructed and arranged as described above, it can satisfactorily perform its two original functions, i.e., prevention of channel interruption caused by a pulse trap and ink supply, without any hindrance.

Figure 6:
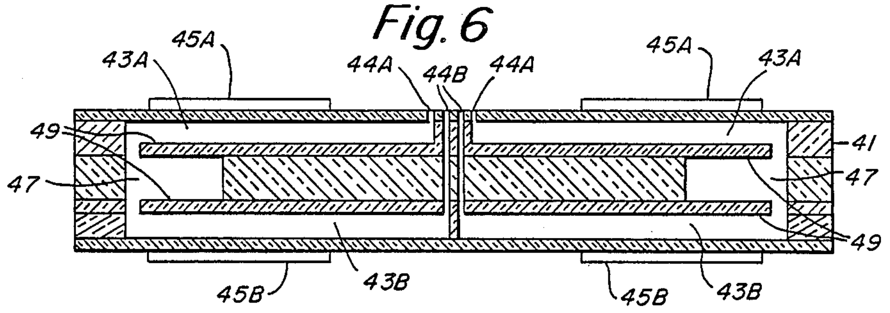

FIG. 6 is a sectional view of a triple decker multinozzle printing head according to still another embodiment of the invention, wherein printing head substrate 41 is provided in such a manner that a plurality of pressure chambers 43A and associated piezoelectric transducers 45A are radially arranged on a plane of the upper stage, and a plurality of pressure chambers 43B and associated piezoelectric transducers 45B are also radially arranged on a plane of the lower stage respectively. Every nozzle is arranged so as to concentrate or open on the upper side of the structure, as shown in FIG. 6. In addition, the other ends of a plurality of the pressure chambers 43A, 43B are arranged stagewise to meet one another to connect to a common ink chamber 47 provided on the middle stage.

Such a triple decker multinozzle printing head of FIG. 6 permits the outer diameter thereof to be smaller and provides a much more compact arrangement than that of the example shown in FIG. 4.

Figure 7:
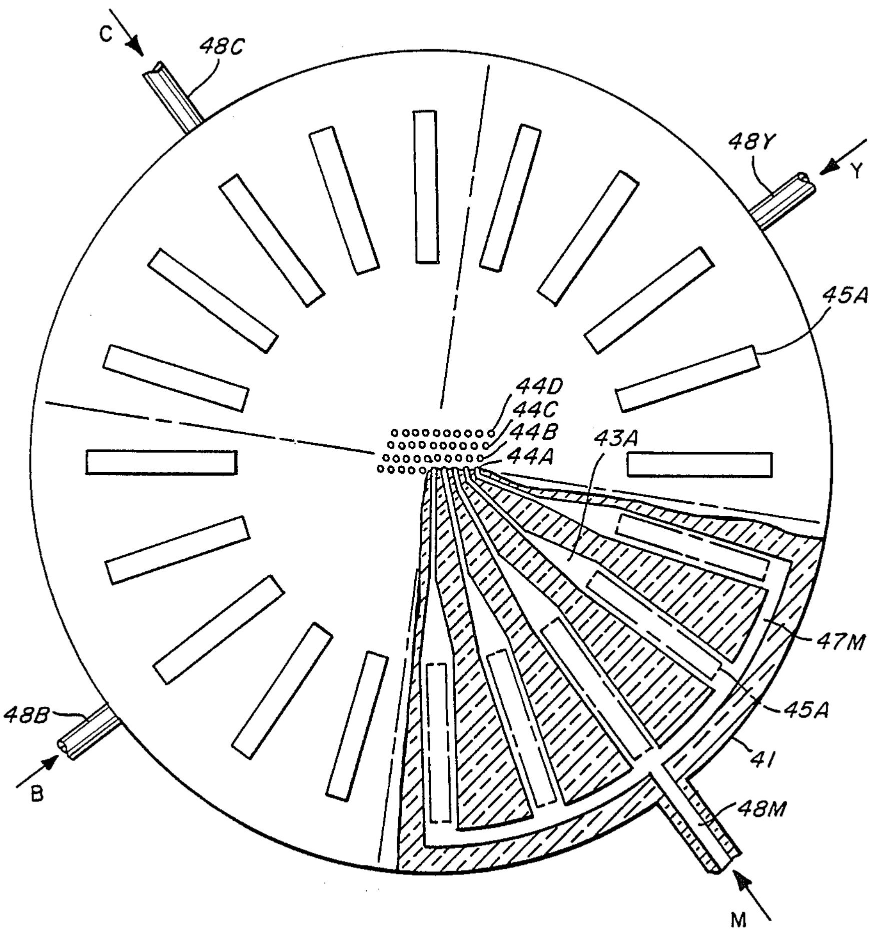
FIG. 7 is a schematic plan view, partially in cross-section, of a printing head utilizing the embodiment of FIG. 6.

FIG. 7 is a plan view showing application of the embodiment shown in FIG. 6, wherein rows of nozzles 44A, 44B, 44C and 44D are arranged in four offset rows to make them close to each other (i.e., to produce a dense arrangement), and the interior of the printing head is divided into four sections. Four ink supply pipes, 48Y, 48M, 48C, 48B and four common ink chambers 47M, etc. (other ink chambers not shown in FIG. 7) are provided respectively so as to correspond to four colors, i.e., yellow (Y), magenta (M), cyan (C) and black (B). Each of the common ink chambers 47 branch off to five channels of pressure chambers 43A, 43B each respectively on the upper and the lower stages (see FIG. 6). Chambers 43A respectively connect with the 5 right-most nozzles 44A (FIG. 7), and chambers 43B respectively connect with the five right-most nozzles 44B (FIG. 7), each of which nozzles concentrate or open on the upper side (see FIG. 7). Thus, 10 nozzles per color, totaling 40 nozzles for four colors, are provided on a plane of the printing head.

Accordingly, in a multinozzle printing head of the invention, it can be achieved that the nozzles are doubled in density on both of the stages and it also makes it possible to miniaturize the printing head by overlaying common ink chambers with the interposition of the intermediate walls of pressure chambers (i.e., walls 38 of FIG. 5 and walls 49 of FIG. 6.). This permits arranging the common ink chambers a little nearer to the center of the printing head. This type of multistage arrangement, with only one unit of miniaturized printing head alone, permits performing not only a four-color ink-jet printing, but also a high resolution or high speed printing by means of a super multinozzle system with not less than 40 channels (i.e. 40 nozzles).

Figure 8:
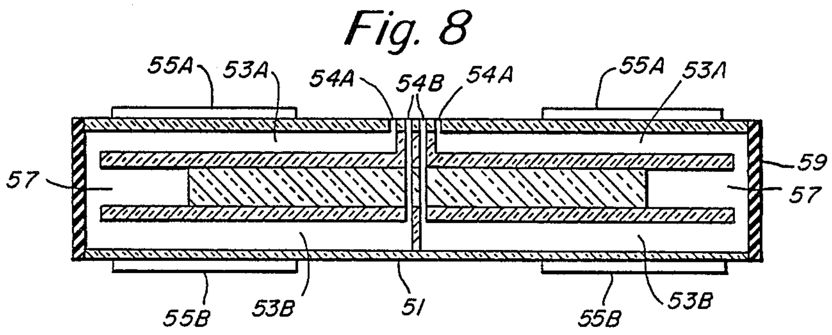

FIG. 8 illustrates still another embodiment of a multinozzle printing head of the invention, which is similar to the embodiment of FIG. 6. In FIG. 8, printing head substrate 51 comprises a plurality of nozzles 54A, 54B, a plurality of pressure chambers 53A, 53B each respectively forming the upper and lower stages which respectively connect with the nozzles 54A, 54B, and common ink chambers 57 provided between the described pressure chambers. The special feature of this embodiment is that a flexible member 59 is used to form at least one side of the walls forming the passage connecting pressure chamber 53A with pressure chamber 53B both arranged to form the upper and lower stages respectively.

Suitable materials for such flexible side members 59 include a thin plate made of rubber or rubber-like material such as polyurethane, butyl, fluorine or the like, or a thin resin film such as polyethylene, polypropylene, polyvinylidene chloride or the like. The flexible member 59 is tightly adhered to the printing head substrate 51. When a pressure chamber 57 is deflected by jetting ink droplets, the change of ink pressure is absorbed by common ink chamber 57 and the interaction between the pressure chambers is almost subsided, the pressure being effectively absorbed by the at least one flexible member 59. The at least one flexible member 59 has a great effect on the pressure absorption and it is therefore possible to miniaturize the common ink chamber 57, and as the result thereof the thickness of the printing head substrate 51 can be made thinner.

The flexible member 59 has also an effect on the absorption of a pressure change relating to an ink supply, and a normal flying of ink droplets may be thereby maintained for good printing performance. For example, in a system where an ink supply is controlled by opening and closing a control valve, it is required that the quantity of ink consumed in ink jetting operations is replenished intermittently by an ink pressure detecting means and an automatic valve means from an ink reservoir to keep the ink pressure substantially constant within a prescribed standard range, and to regulate such ink supply from the ink reservoir so as to perform a proper jetting of ink droplets. However, there are some instances where the ink pressure temporarily becomes excessively increased or decreased because of the delay in an ink pressure adjustment at the time of replenishment of ink as described above; that is, the time delay between the start of a detection of excessive or deficient ink pressure and the finish of an ink replenishment made in the described valve operation.

Flexible member 59 of the invention has been devised for solving the abovementioned problem. That is, when the ink pressure becomes temporarily excessive or deficient, as described above, the flexible member 59 is elastically deformed to bend outward or inward to the ink flow passage and thus the ink pressure is compensated so as to be within the standard level or range by the volume change of the ink flow passage (i.e. ink flow chamber 57).

In an ink supply system having no valve therein and supplying ink to the printing head by means of the surface tension in each nozzle and of the static ink pressure in an ink reservoir, there are also instances where ink supply is unable to satisfactorily be replenished according to the quantity of ink consumed with the variations of printing density. The ink pressure therefore fluctuates in the printing head. Nevertheless, the above described flexible side member 57 effectively absorbs such pressure fluctuations, and ink droplets can be thereby insured to fly properly.

The described flexible member 59 shall not be limited to be provided at the position illustrated in FIG. 8, but may be provided onto any other suitable wall of the common ink chamber. As described above, the described flexible member 59 is not only effective for adjusting ink pressure provided it is arranged adjacent to the common ink chamber, but it also enables miniaturizing of the printing heads.

Figure 9:
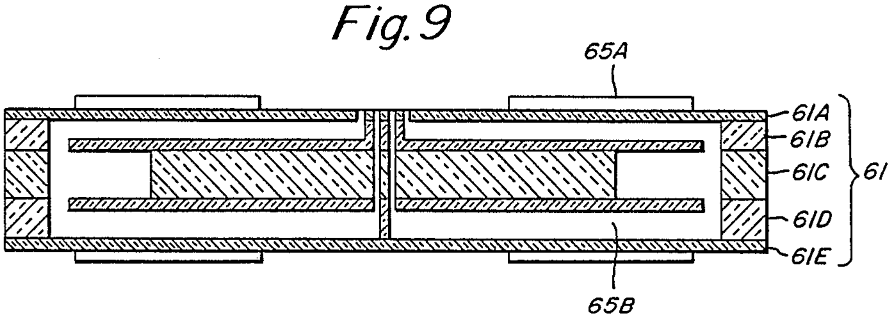
FIG. 9 is an illustration of how to manufacture an ink-jet printing head of the present invention.

FIG. 9 shows an example of how to construct a printing head of the invention. A nozzle plate 61A is provided with a nozzle-orifice which is made by etching or wire-draw-molding. Channel plates 61B, 61D each are provided to form pressure chambers, ink flow passages connecting the pressure chambers with the nozzles and channels connecting the pressure chambers with a common ink chamber respectively by means of double-etching. Base plate 61C is provided to form the common ink chamber by etching.

These etching methods are well-known. For example, an etching method in which a photosensitive glass plate is exposed to light and then etched, can be used.

In the printing head of FIG. 9, thermal-bonding of the plates 61A, 61C, 61D and plane plate 61E is carried out.

In the embodiments of FIGS. 2,3,4,5,6,7 and 8, the walls on which the piezoelectric transducers are mounted are flexible, as should be apparent.

As described above, in the present invention, the hollows of ink flow passages in a printing head are made substanially even in depth and thereby only a single etching treatment is adequate to form these hollows. Further the invention is capable of equipping one printing head with a number of nozzles and pressure chambers to permit high nozzle density and printing at a high speed, with a high resolution or in color. Still further, miniaturizing of the printing head is facilitated, and in the FIG. 8 embodiment, pressure regulation is made easier.

The plate-like members of the present invention are preferably made of light-sensitive glass, so that the hollows for the ink-flow passages can be formed by chemical etching thereof. Similarly, the nozzles can be formed by chemical etching. This facilitates manufacture of the printing head of the present invention.

Various modifications and alterations can be made within the scope of the invention, as defined in the appended claims.

We claim:

1. A printing head for an ink jet printing apparatus having plurality of ink-jetting units disposed substantially parallel to a circular-shaped reference plane, each of said ink-jetting units comprising:

an ink supply pipe;

an arcuately-shaped common ink chamber connected to said supply pipe to receive ink therefrom and defined in part by a radially inner arcuate wall and a radially outer arcuate wall in said reference plane at respective given distances from a center of said circular-shaped reference plane;

a group of pressure chambers connected to said common ink chamber to receive ink therefrom and extending radially generally toward said center from the inner arcuate wall of said common chamber;

a piezoelectric transducer operably disposed, respectively, on each of said group of pressure chambers; and at least one nozzle orifice coupled to each of said pressure chambers and from which ink is to be ejected dropwise, said at least one nozzle orifice being disposed to eject ink substantially perpendicularly to said reference plane upon energization of said piezoelectric transducer;

said at least one nozzle orifice of said pressure chambers being closely adjacent to each other; and said nozzle orifices of each of said ink-jetting units being adjacent each other and opening on said reference plane.

2. The printing head of claim 1, wherein said printing head comprises at least two members laminated on each other, at least one of said members having a hollow formed therein so as to comprise said common ink chamber; and wherein said nozzle orifices are formed in at least one of said laminated members.

3. The printing head of claim 2, wherein said nozzle orifices are formed in the other of said laminated members.

4. The printing head of claim 2 or 3, wherein said laminated members comprise laminated plate-like members.

5. The printing head of claim 2, wherein said two laminated members define said common ink chamber of all of said ink-jetting units therebetween, all of said nozzle orifices opening in one of said members.

6. The printing head of claim 5, wherein said nozzle orifices open in a direction substantially perpendicular to the main plane of said two laminated members.

7. The printing head of claim 2 or 3, wherein said nozzle orifices are formed by etching or drilling one of said laminated members.

8. The printing head of any one of claims 1, 2 or 3, wherein each of said ink-jetting units comprises at least one flexible wall coupled to said group of pressure chambers thereof, said piezoelectric transducer being disposed on said at least one flexible wall, whereby energization of said piezolelectric transducer causes flexing of said flexible wall to cause ink to be ejected from said nozzles associated with said group of pressure chambers; said nozzle orifices facing a recording medium for ejecting ink onto said recording medium in a dropwise manner.

9. The printing head of claim 8, wherein said pressure chambers are elongated chambers which are circularly arranged in groups such that pressure chambers of said groups are extending radially, and wherein said nozzle orifices are arranged regularly substantially at the center of said circularly arranged group of pressure chambers.

10. The printing head of any one of claims 1, 2 or 3, wherein said group of pressure chambers of said ink-jetting units comprises a flexible wall in communication with said pressure chambers of said group, and wherein said piezoelectric transducer is disposed on said flexible wall to cause said flexible wall to deform in a direction to reduce the volume of said pressure chambers to thereby produce jetting of ink from said associated nozzle orifices when said piezoelectric transducer is energized.

11. The printing head of claim 2, wherein at least one of said laminated members is made of a light-sensitive glass material, and said pressure chambers for said ink are formed by chemical etching thereof.

12. The printing head of claim 1 or 2, wherein said ink-jetting units each comprise at least two flexible wall portions in communication with said group of pressure chambers, one of said flexible wall portions being coupled to said piezoelectric transducer for causing inward deflection of said at least one flexible wall portion to reduce the volume of said pressure chambers, and the other of said flexible wall portions yielding to absorb pressure changes in said pressure chambers.

13. The printing head of claim 12, wherein said other flexible wall portion extends between two laminated members.

14. The printing head of claim 12, wherein said other flexible wall portion is comprised of rubber or rubber-like materials.

15. The printing head of claim 12, wherein said flexible wall is on the opposite side of said pressure chambers from said nozzle orifices.

16. The printing head of claim 1, wherein two of said ink-jetting units are arranged one above the other, said pressure chambers of each unit being coupled to the same common ink chamber; said nozzle orifices of each of said two units opening on the same surface of said printing head so as to face a recording medium.

17. The printing head of claim 16, further comprising at least one intermediate wall extending at least partially across said common ink chamber and extending between said pressure chambers of said two units.

18. The printing head of claim 16, wherein said pressure chambers of said two units are arranged back-to-back, and wherein said pressure chambers of each unit comprises a flexible wall in communication therewith, a piezoelectric transducer being mounted on each of said flexible walls.

* * * * *